United States Patent
Tonishi et al.

(10) Patent No.: US 7,971,983 B2
(45) Date of Patent: *Jul. 5, 2011

(54) INK SET FOR INK-JET RECORDING, INK-JET RECORDING METHOD, AND INK-JET RECORDING APPARATUS

(75) Inventors: Hisako Tonishi, Kariya (JP); Ryuji Kato, Aisai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 506 days.

This patent is subject to a terminal disclaimer.

(21) Appl. No.: 11/972,664

(22) Filed: Jan. 11, 2008

(65) Prior Publication Data

US 2008/0171148 A1    Jul. 17, 2008

(30) Foreign Application Priority Data

Jan. 12, 2007    (JP) .................................. 2007-004631

(51) Int. Cl.
*C09D 11/00* (2006.01)

(52) U.S. Cl. ..................................... 347/100; 106/31.13

(58) Field of Classification Search .................. 347/100; 106/31.13

See application file for complete search history.

(56) References Cited

U.S. PATENT DOCUMENTS

| 7,766,471 B2 * | 8/2010 | Kato et al. ..................... 347/100 |
| 2002/0140790 A1 * | 10/2002 | Moriyama et al. ............... 347/96 |
| 2005/0024458 A1 * | 2/2005 | Sanada et al. .................. 347/100 |

FOREIGN PATENT DOCUMENTS

| JP | 2003-082267 | | 3/2003 |
| JP | 2006063322 A | * | 3/2006 |

* cited by examiner

*Primary Examiner* — Laura E Martin

(74) *Attorney, Agent, or Firm* — Banner & Witcoff, Ltd.

(57) ABSTRACT

An ink set for ink-jet recording, which provides a vivid and sharp ink-jet recorded material with no bleeding, is composed of a plurality of pigment inks and configured such that the average particle diameter of a pigment contained in any ink precedently landing on a recording medium is less than that of a pigment contained in another ink subsequently landing on the recording medium, and such that at least two pigment inks are different in average particle diameter of the pigment contained therein to each other.

10 Claims, No Drawings

INK SET FOR INK-JET RECORDING, INK-JET RECORDING METHOD, AND INK-JET RECORDING APPARATUS

CROSS REFERENCE TO RELATED APPLICATION

The present invention claims a priority from Japanese Patent Application No. 2007-004631, which was filed on Jan. 12, 2007, the disclosure of which is herein incorporated by reference in its entirety.

BACKGROUND

1. Field of the Invention

The present invention relates to an ink set for ink-jet recording, to an ink-jet recording method and to an ink-jet recording apparatus.

2. Description of the Related Art

A water-based ink set for ink-jet recording employed a plurality of pigment inks has been widely used. In such pigment inks, pigments generally exhibiting better light fastness water resistance and ozone resistance than dyes are used as coloring agents. However, bleeding has been a problem in ink-jet recorded materials recorded with such a water-based ink set on plain paper by means of ink-jet recording. The bleeding occurs when different pigment inks are mixed together in a boundary portion between a color region formed using a pigment ink and another color region formed using another pigment ink.

To suppress such bleeding, an ink-set for ink-jet recording has been proposed in which the diameter of pigment particles contained in a black ink and the diameter of pigment particles contained in color inks are adjusted relative to each other.

However, a vivid and sharp ink-jet recorded material with no bleeding cannot be obtained when the diameter of the pigment particles contained in the black ink and the diameter of the pigment particles contained in the color inks are simply adjusted relative to each other.

SUMMARY

The present invention has been developed in order to solve the foregoing problems, and it is an object of the present invention to provide an ink set for ink-jet recording which provides a vivid and sharp ink-jet recorded material with no bleeding, an ink-jet recording method and an ink-jet recording apparatus.

The present inventors have found that the above object can be achieved in the following manner. The average particle diameter of a pigment contained in a pigment ink that precedently lands on a recording medium is adjusted to be equal to or less than the average particle diameter of a pigment contained in a pigment ink that subsequently lands on the recording medium. In addition to this, at least two pigment inks are adjusted so as to be different in average particle diameter to each other. Thus, the present invention has been completed.

The present invention provides an ink set for ink-jet recording including a plurality of pigment inks each including a pigment, wherein an average particle diameter of the pigment contained in a pigment ink that precedently lands on a recording medium is equal to or less than an average particle diameter of the pigment contained in a pigment ink that subsequently lands on the recording medium, and wherein at least two pigment inks are different in average particle diameter of the pigment contained therein to each other.

The present invention provides an ink-jet recording method in which pigment inks constituting an ink set for ink-jet recording are ejected from an ink-jet head onto a recording medium in order to form an ink-jet recording image on the recording medium, the ink-jet recording method comprising:

preparing an ink set for ink-jet recording comprising a plurality of pigment inks, where at least two pigment inks which are different in average particle diameter to each other;

landing a first pigment ink in the ink set on the recording medium; and subsequently landing a second pigment ink in the ink set on the recording medium, an average particle diameter of the pigment contained in the second pigment ink is equal to or larger than that of the pigment contained in the first pigment ink.

The present invention provides an ink-jet recording apparatus, comprising:

an ink set for ink-jet recording including a plurality of pigment inks each including a pigment, wherein an average particle diameter of the pigment contained in a pigment ink that precedently lands on a recording medium is equal to or less than an average particle diameter of the pigment contained in a pigment ink that subsequently lands on the recording medium, and wherein at least two pigment inks are different in average particle diameter of the pigment contained therein to each other;

an ink-jet head for ejecting the pigment inks constituting the ink set onto the recording medium; and an image forming device for forming an ink-jet recording image on the recording medium by landing a first pigment ink in the ink set on the recording medium and subsequently landing a second pigment ink in the ink set on the recording medium, the pigment contained in the second pigment ink having an average particle diameter equal to or larger than an average particle diameter of the pigment contained in the one of the first pigment ink.

DETAILED DESCRIPTION OF THE PREFERRED EMBODIMENTS

An ink set for ink-jet recording includes a plurality of pigment inks. A pigment ink in the ink set that precedently lands on a recording medium contains a pigment having an average particle diameter equal to or less than an average particle diameter of a pigment contained in a pigment ink in the ink set that subsequently lands on the recording medium. In addition to this, at least two pigment inks are different in average particle diameter of a pigment contained therein to each other. Therefore, the pigment contained in the pigment ink that subsequently lands on the recording medium is less likely to enter gaps between the pigment particles contained in the pigment ink that has precedently landed on the recording medium, and is less likely to diffuse therein. Hence, bleeding in a boundary between different color regions in an ink-jet recorded material may be suppressed.

The ink set may be composed of two types of pigment inks (an ink A (the average particle diameter of the pigment: Aa) and an ink B (the average particle diameter of the pigment: Bb)). In this case, the average particle diameter (Aa) of the pigment contained in the ink A that precedently lands on a recording medium is always less than the average particle diameter (Bb) of the pigment contained in ink B that subsequently lands on the recording medium.

$$Aa<Bb$$

The ink set may be composed of three types of pigment inks (an ink A (the average particle diameter of the pigment: Aa), an ink B (the average particle diameter of the pigment: Bb) and an ink C (the average particle diameter of the pigment: Cc)). In this case, when these three types of pigment inks land on a recording medium in the order of the ink A, the ink B and the ink C, the relationship in average particle diameter between the pigments contained in the three pigment inks is represented by any of the following relational inequalities:

$$Aa \leq Bb < Cc$$

$$Aa < Bb \leq Cc$$

The ink set may be composed of four types of pigment inks (an ink A (the average particle diameter of the pigment: Aa), an ink B (the average particle diameter of the pigment: Bb), an ink C (the average particle diameter of the pigment: Cc) and an ink D (the average particle diameter of the pigment: Dd)). In this case, when these four types of pigment inks land on a recording medium in the order of the ink A, the ink B, the ink C and the ink D, the relationship in average particle diameter between the pigments contained in the four pigment inks is represented by any of the following relational inequalities:

$$Aa \leq Bb < Cc < Dd$$

$$Aa < Bb \leq Cc < Dd$$

$$Aa < Bb < Cc \leq Dd$$

$$Aa \leq Bb \leq Cc < Dd$$

$$Aa \leq Bb < Cc \leq Dd$$

$$Aa < Bb \leq Cc \leq Dd$$

The average particle diameter of a pigment is a volume average particle diameter weighted by volume defined in JIS Z8819-2 or the like. For example, the average particle diameter may be measured using a dynamic light scattering nanoparticle diameter analyzer LB 500 (product of HORIBA, Ltd.) or the like.

An expression of "the average particle diameter of a pigment contained in a pigment ink that precedently lands on a recording medium is equal to or less than the average particle diameter of a pigment contained in a pigment ink that subsequently lands on the recording medium" is used herein. The expression specifically and preferably refers to the extent that the 75% cumulative particle diameter of the pigment contained in the pigment ink that precedently lands on the recording medium is less than the 25% cumulative particle diameter of the pigment contained in the pigment ink that subsequently lands on the recording medium. When the above condition is satisfied, the effect of suppressing bleeding may be further improved. Specifically, let the pigment contained in the pigment ink that precedently lands on the recording medium be denoted by a pigment X, and let the pigment contained in the pigment ink that subsequently lands on the recording medium be denoted by a pigment Y. Then, the profile of a cumulative volume curve of each of the pigments relative to the particle diameter is determined. It is preferable that the particle diameter at a point where the cumulative volume curve of the pigment X reads 75% (the 75% cumulative particle diameter) be less than the particle diameter at a point where the cumulative volume curve of the pigment Y reads 25% (the 25% cumulative particle diameter).

The dynamic surface tension of a pigment ink that precedently lands on the recording medium is equal to or less than that of a pigment ink that subsequently lands on the recording medium. The dynamic surface tension of a liquid such as an ink is different from a static surface tension and is a surface tension with a lifetime in the order of several tens to several thousands of ms. The dynamic surface tension is considered to have a considerable influence on the penetrability of an ink into a recording material when the ink lands thereon. When the dynamic surface tension of an ink is high, the penetrability of the ink into a recording medium is low. Conversely, when the dynamic surface tension is low, the penetrability of the ink into a recording medium is high. Therefore, it is preferable that the dynamic surface tension of a pigment ink that precedently lands on a recording medium be equal to or less than that of a pigment ink that subsequently lands on the recording medium. In this case, after the pigment ink that is precedently landed on the recording medium penetrates sufficiently into the recording medium, the pigment ink which is less likely to penetrate into the recording medium lands on the recording medium. Consequently, bleeding is suppressed. In a general ink-jet recording method, the penetration phenomenon of an ink-jet ink to a recording medium is completed in the order of several tens of ms after the ink-jet ink lands on the recording medium. Therefore, in the present invention, in consideration of errors or the like in a dynamic surface tension measuring apparatus, the value of the dynamic surface tension at a lifetime of 100 ms is employed since the measurement accuracy is stable thereat. In addition to this, the measurement temperature is set at 25° C., which is a typical operational temperature for the ink.

A method for measuring the dynamic surface tension is described as follows.

It has been known that the dynamic surface tension of a liquid such as an ink is generally measured by an oscillating jet method, a meniscus method, a maximum bubble pressure method, or the like. However, the value of the dynamic surface tension defined in the present invention is measured by means of the maximum bubble pressure method (the dynamic surface tension can be measured by means of an automatic dynamic surface tension meter BP-D4 (product of Kyowa Interface Science Co., LTD.) or the like). In the measurement of the dynamic surface tension by mean of the maximum bubble pressure method, a gas is fed from a gas supply source to a probe immersed in an ink in order to generate a bubble at the end of the probe. At this time, the generation rate of the bubble is changed by changing the flow rate of the gas. The pressure on the bubble from the ink is changed with the change in the gas bubble generation rate, and the surface tension is measured via this change in pressure. The pressure reaches a maximum (the maximum bubble pressure) when the radius of the bubble is equal to the radius of the end portion of the probe. The dynamic surface tension σ of the ink at this moment is represented by the following equation:

$$\sigma = (\Delta P \times r)/2$$

In this instance, r is the radius of the end portion of the probe, and ΔP is the difference between the maximum pressure and the minimum pressure on the bubble. The maximum value of this difference is the maximum pressure (the maximum bubble pressure) when the radius of curvature of the bubble is equal to the radius of the end portion of the probe. The term "lifetime" refers to the period from when, after the pressure reaches the maximum bubble pressure, a bubble is separated from the probe and a new surface is generated to when the pressure again reaches the maximum bubble pressure.

In the expression "a plurality of pigment inks constituting the ink set for ink-jet recording" the term "plurality" should be understood to refer to at least two. The effect of suppressing bleeding may be clearly observed in a combination of a black ink and a yellow ink. When a black ink, a yellow ink, a magenta ink and a cyan ink are used as the plurality of pigment inks, an ink set suitable to full color image recording may be constituted.

Examples of the pigments are shown. Specific examples of the pigment used in the black ink include, without limitation, carbon blacks such as MA7, MA8, MA100 (products of Mitsubishi Chemical Corporation) and color black FW200 (product of Degussa). Examples of the pigment used in the yellow ink include, without limitation, C.I. Pigment Yellows 3, 13, 74, 83, 128, 154 and the like. Examples of the pigment used in the magenta ink include, without limitation, C.I. Pigment Reds 5, 48, 112, 122, 177, 202, 207 and the like. Examples of the pigment used in the cyan ink include, without limitation, C.I. Pigment Blues 15, 15:3, 15:4, 16, 60 and the like. The above examples are only preferred pigments suitable, and the present invention is not limited thereto.

The amount of the pigment contained in each of the pigment inks in the ink set for ink-jet recording depends on a predetermined printing density, color and the like. When the amount of the pigment is too low, the color is not satisfactorily developed on a recording medium such as a paper. When the amount is too high, the nozzles of an ink-jet head are likely to be clogged. Thus, the amount of the pigment with respect to the total amount of the ink is in the range of about 0.1 wt. % to about 10 wt. %, and in the range of about 1 wt. % to about 7 wt. %.

A dispersing agent for pigment may be added to each of the pigment inks in order to maintain the dispersion stability of the ink. Examples of the dispersing agent include, without limitation, a polymer dispersing agent, a surfactant and the like. Examples of the polymer dispersing agent include, without limitation, proteins such as gelatin and albumin; natural rubbers such as gum arabic and tragacanth; glucosides such as saponin; cellulose derivatives such as methyl cellulose, carboxy cellulose and hydroxy methyl cellulose; natural polymers such as lignin sulfonate and shellac; anionic polymers such as salts of polyacrylic acid, salts of styrene-acrylic acid copolymers, salts of vinylnaphthalene-acrylic acid copolymers, salts of styrene-maleic acid copolymers, salts of vinylnaphthalene-maleic acid copolymers, sodium salts of β-naphthalenesulfonic acid formalin condensate and phosphates of β-naphthalenesulfonic acid formalin condensate; non-ionic polymers such as polyvinyl alcohol, polyvinyl pyrrolidone, and polyethylene glycol; and the like. Examples of the surfactant include, without limitation, anionic surfactants such as higher alcohol sulfate ester salts, liquid fatty oil sulfate ester salts and alkyl allyl sulfonates; and non-ionic surfactants such as polyoxyethylene alkyl ethers, polyoxyethylene alkyl esters, sorbitan alkyl esters and polyoxyethylene sorbitan alkyl esters. The dispersing agent may be used alone or in suitable combination of two or more thereof.

The amount of the dispersing agent depends on the type of the pigment and the type of the dispersing agent and is appropriately determined so as to properly function as a dispersing agent. When the amount of the dispersing agent is too low, the dispersion stability of the pigment is insufficient. When the amount is too high, the viscosity of the ink increases to cause difficulty in ejecting the ink from an ink-jet head. Therefore, the amount of the dispersing agent with respect to the amount of the corresponding pigment is in the range of about 5 wt. % to about 50 wt. %, and in the range of about 10 wt. % to about 40 wt. %.

When the dispersing agent for pigment is added to each of the pigment inks, it is preferable to further disperse the pigment by means of a dispersing apparatus. No particular limitation is imposed on the dispersing apparatus used for dispersing the pigment, so long as it is a dispersing apparatus of a general type. Examples of the dispersing apparatus include, without limitation, a ball mill, a roll mill, a sand mill and the like. Of these, a sand mill of a high speed type is preferred.

In the ink set for ink-jet recording, the water employed in each of the inks may be deionized water. The amount of water depends on the type of the water soluble organic solvents used, the composition and the desired properties of each of the inks, and is determined to fall over a wide range. When the amount of the water is too low, the viscosity of the ink increases to cause difficulty in ejection of the ink from an ink-jet head. When the amount is too high, the coloring agent is precipitated out or aggregated due to the evaporation of water, and therefore the nozzles of an ink-jet head are likely to become clogged. Therefore, the amount of the water with respect to the total amount of the ink is in the range of about 10 wt. % to about 95 wt. %, and in the range of about 10 wt. % to about 80 wt. %.

The water soluble organic solvents used in each of the inks in the ink set for ink-jet recording are broadly categorized into humectants and penetrants. A water soluble organic solvent used as a humectant is added to each ink in order to prevent clogging of the nozzles of an ink-jet head. A water soluble organic solvent used as a penetrant is added to each ink in order to allow the ink to rapidly penetrate into a recording medium upon printing.

Examples of the humectant include, without limitation, lower alcohols such as methyl alcohol, ethyl alcohol, n-propyl alcohol, isopropyl alcohol, n-butyl alcohol, sec-butyl alcohol and tert-butyl alcohol; polyalcohols such as 1,3-butanediol, 1,5-pentandiol, 1,6-hexanediol, glycerin, 1,2,6-hexanetriol, 1,2,4-butanetriol, 1,2,3-butanetriol and pentantriol; alkylene glycols such as ethylene glycol, diethylene glycol, triethylene glycol, propylene glycol, dipropylene glycol, tripropylene glycol, butylene glycol, thiodiglycol and hexylene glycol; polyalkylene glycols such as polyethylene glycol and polypropylene glycol; amides such as formamide, N-methylformamide, N,N-dimethylformamide and dimethylacetamide; amines such as monoethanolamine, diethanolamine, triethanolamine, monoethylamine, diethylamine and triethylamine; ketons and keto-alcohols such as acetone and diaceton alcohol; ethers such as tetrahydrofuran and dioxane; pyrrolidones such as 2-pyrrolidone, N-methyl-2-pyrrolidone and N-hydroxyethyl-2-pyrrolidone; nitrogen-containing heterocyclic compounds such as 1,3-dimethylimidazolidinone and e-caprolactam; sulfur-containing compounds such as dimethyl sulfoxide, sulfolane and thiodiethanol; and the like. Of these, alkylene glycols and polyalcohols such as glycerin are preferred. These humectants may be used alone or as a mixture of two or more. When the amount of the water soluble organic solvent serving as the humectant is too low, the clogging of the nozzles of an ink-jet head is not satisfactorily prevented. When the amount is too high, the viscosity of the ink increases to cause difficulty in ejection of the ink from an ink-jet head. Therefore, the amount of the water soluble organic solvent with respect to the total amount of the ink is in the range of about 5 wt. % to about 50 wt. %, and in the range of about 10 wt. % to about 40 wt. %.

Examples of the penetrant include, without limitation, ethylene glycol methyl ether, ethylene glycol ethyl ether, ethylene glycol propyl ether, ethylene glycol butyl ether, diethylene glycol methyl ether, diethylene glycol ethyl ether, diethylene glycol propyl ether, diethylene glycol butyl ether, diethylene glycol dimethyl ether, diethylene glycol diethyl ether, diethylene glycol dipropyl ether, diethylene glycol dibutyl ether, triethylene glycol methyl ether, triethylene glycol ethyl ether, triethylene glycol propyl ether, triethylene glycol butyl ether, triethylene glycol dimethyl ether, triethylene glycol diethyl ether, triethylene glycol dipropyl ether, triethylene glycol dibutyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol propyl ether, dipropylene glycol butyl ether, dipropylene glycol dimethyl ether, dipropylene glycol diethyl ether, dipropylene glycol dipropyl ether, dipropylene glycol dibutyl ether, tripropylene glycol methyl ether, tripropylene glycol ethyl ether, tripropylene glycol propyl ether, tripropylene glycol butyl ether, tripropylene glycol dimethyl ether, tripropylene glycol diethyl ether, tripropylene glycol dipropyl ether, tripropylene glycol dibutyl ether and the like. These penetrants may be used alone or as a mixture of two or more. When the amount of the water soluble organic solvent serving as the penetrant is too low, the penetrability is unsatisfactory. When the amount is too high, the penetrability becomes excessively high, so that bleeding such as feathering is likely to occur. Therefore, the amount of the water soluble organic solvent with respect to the total amount of the ink is in the range of about 0.1 wt. % to about 10 wt. %, and in the range of about 0.5 wt. % to about 7 wt. %.

The above is the basic composition of each of the pigment inks in the ink set for ink-jet recording. In addition, other conventionally known surfactants; viscosity modifiers such as polyvinyl alcohol, polyvinylpyrrolidone and water soluble resins; surface tension modifiers; mildew proofing agents; anticorrosive agents; pH modifiers; and the like may be added if necessary.

The ink set for ink-jet recording may be manufactured by preparing the inks by means of routine methods and filling the inks into respective desired ink cartridges.

A description will now be given of an ink-jet recording method. In this ink-jet recording method, the above-described pigment inks constituting the ink set for ink-jet recording are ejected from an ink-jet head onto a recording medium such as an plain paper or a glossy paper, whereby an ink-jet recording image is formed on the recording medium. In this recording method, a first pigment ink in the ink set (or a pigment ink to be precedently landed on the recording medium) is landed on the recording medium. Subsequently, a second pigment ink in the ink set (or a pigment ink to be subsequently landed on the recording medium) is landed on the recording medium. In this instance, the second pigment ink contains a pigment having an average particle diameter equal to or larger than an average particle diameter of a pigment contained in the first pigment ink. In this manner, bleeding between different pigment inks may be suppressed. A combination of a black ink and a yellow ink is suitable as the pigment inks. In addition, a combination of a black ink, a yellow ink, a magenta ink, and a cyan ink is also preferred.

In the ink-jet recording method, it is suitable that the 75% cumulative particle diameter of the pigment contained in the first pigment ink be less than the 25% cumulative particle diameter of the pigment contained in the second pigment ink in order to further suppress bleeding. Moreover, it is suitable that the dynamic surface tension of the first pigment ink be equal to or less than that of the second pigment ink.

A description will now be given of an ink-jet recording apparatus. This ink-jet recording apparatus includes: the ink-set for ink-jet recording of the present invention; an ink-jet head for ejecting the pigment inks constituting the ink set onto a recording medium; and an image forming device for performing the ink-jet recording method of the present invention. Any recording medium and any ink-jet head used in conventional ink-jet recording may be used in the ink-jet recording apparatus as appropriate. For example, a piezoelectric ejection type head, an electrostatic ejection type head, a thermal ejection type head or the like may by used as the ink-jet head. In addition, an ink-jet head with an ejection nozzle diameter in the range of about 10 μm to about 50 μm may be used.

Any devices capable of controlling the order of ejection based on the average particle diameter of the pigment contained in each of the pigment inks constituting the ink set may be used as the device for performing the ink-jet recording method of the present invention. For example, mono-directional printing may be used in which printing is performed only when an ink-jet head moves in one direction, and, when printing is performed while an ink-jet head moves in both the moving directions, nozzles of the ink-jet head are arranged in a specially designed configuration.

EXAMPLES

The present invention will next be specifically described by way of Examples and Comparative Examples, but the present invention in not limited to these Examples. Various changes, modifications and improvements may be made based on the knowledge of a person skilled in the art, as long as they do not depart from the scope of the present invention.

(Preparation of Inks)
(1) Black ink 1 (Bk1)

After 25 wt. % of MA7 (carbon black, product of Mitsubishi Chemical Corporation), 25 wt. % of Disperbyk®-190 (product of BYK Japan KK), 10 wt. % of glycerin and 40 wt. % of water (ion exchanged water) were mixed, the mixture was subjected to dispersion treatment at 98 MPa by means of Nanomizer (product of Nanomizer, Inc.), whereby a carbon black dispersion was obtained. The carbon black dispersion was subjected to a centrifuge to remove coarse particles. Furthermore, 55.9 wt. % of water (ion exchanged water), 20 wt. % of glycerin, 4 wt. % of triethylene glycol butyl ether and 0.1 wt. % of Surfynol® 465 (product of Air Products and Chemicals, Inc.) were mixed, whereby 80 wt. % of an ink solvent was prepared. Subsequently, 80 wt. % of the prepared ink solvent was gradually added to 20 wt. % of the carbon black dispersion under stirring, and the stirring was continued for 30 minutes. Then, the mixture was filtrated through a membrane filter having a pore diameter of 1 μm, whereby a black ink 1 was prepared. The amount of carbon black with respect to the total amount of the ink was 5 wt. %.

(2) Preparation of Black Inks 2 to 4 (Bk2 to Bk4), Yellow Inks (Y1 to Y3), Magenta Inks (M1 to M3) and Cyan Inks (C1 to C3)

Inks each having the ink composition summarized in Table 1 were prepared according the preparation method of the black ink 1. The composition of each of the inks summarized in Table 1 represents the actual ink composition with respect to the total amount of the ink in percent by weight.

(Measurement of average particle diameter, 25% cumulative particle diameter and 75% cumulative particle diameter)

Each of the inks was measured for the average particle diameter, 25% cumulative particle diameter and 75% cumulative particle diameter of the pigment by means of a dynamic light scattering nanoparticle diameter analyzer (LB 500, product of HORIBA, Ltd.). The results obtained are summarized in Table 1.

(Measurement of Dynamic Surface Tension)

Each of the inks was subjected to dynamic surface tension measurement at lifetimes in the range of 20 ms to 5,000 ms at a measurement temperature of 25° C. by means of an automatic dynamic surface tension meter (BP-D4, product of Kyowa Interface Science Co., LTD.). Then, the value of the dynamic surface tension at a lifetime of 100 ms was read. The results obtained are summarized in Table 1.

Examples 1 to 7 and Comparative Examples 1 to 4

Each of the inks summarized in Table 1 was filled into a predetermined ink cartridge, and the ink cartridges were combined as summarized in Tables 2 to 4 to constitute ink sets for ink-jet recording. Each of the ink sets was attached to a digital multifunction device equipped with an ink-jet recording apparatus (DCP-110C, product of Brother Industries, Ltd.), and a printing evaluation was performed. A text printing pattern was printed on plain paper (DATA COPY paper, product of m-real) to perform printing evaluation. Bleeding was evaluated as follows.

<Bleeding Evaluation>

Bleeding between ink recorded portions in the text printing pattern was observed visually and was evaluated according to the following criteria. The evaluation results are summarized in Tables 2 to 4.

A: Bleeding is not found.
B: Bleeding is almost unnoticeable.
C: Bleeding is noticeable. Practically problematic.
D: Bleeding is highly noticeable. Practically unsuitable.

TABLE 1

|  |  | Bk1 | Bk2 | Bk3 | Bk4 | Y1 | Y2 | Y3 | M1 | M2 | M3 | C1 | C2 | C3 |
|---|---|---|---|---|---|---|---|---|---|---|---|---|---|---|
| Ink composition (wt. %) | Carbon black | 5.0 | 5.0 | 5.0 | 5.0 | — | — | — | — | — | — | — | — | — |
|  | C.I. Pigment Yellow 128 | — | — | — | — | 4.0 | 4.0 | 4.0 | — | — | — | — | — | — |
|  | C.I. Pigment Red 122 | — | — | — | — | — | — | — | 4.0 | 4.0 | 4.0 | — | — | — |
|  | C.I. Pigment Blue 153 | — | — | — | — | — | — | — | — | — | — | 4.0 | 4.0 | 4.0 |
|  | Glycerin | 22.0 | 20.0 | 21.0 | 18.0 | 19.0 | 23.0 | 19.0 | 22.0 | 19.0 | 22.0 | 20.0 | 21.0 | 20.0 |
|  | Triethylene glycol butyl ether | 4.0 | 6.0 | 5.0 | 8.0 | 8.0 | 4.0 | 8.0 | 5.0 | 8.0 | 5.0 | 7.0 | 6.0 | 7.0 |
|  | Surfynol ® 465[1] | 0.1 | 0.1 | 0.1 | 0.1 | 0.1 | 0.1 | 0.1 | 0.1 | 0.1 | 0.1 | 0.1 | 0.1 | 0.1 |
|  | Disperbyk ®-190[2] | 5.0 | 5.0 | 5.0 | 5.0 | 5.0 | 5.0 | 5.0 | 5.0 | 5.0 | 5.0 | 5.0 | 5.0 | 5.0 |
|  | Water | Balance | | | | | | | | | | | | |
| Properties | Average particle diameter (nm) | 178 | 94 | 107 | 46 | 87 | 168 | 164 | 109 | 77 | 147 | 70 | 125 | 113 |
|  | 25% cumulative particle diameter (nm) | 138 | 72 | 82 | 36 | 67 | 132 | 129 | 82 | 58 | 115 | 56 | 94 | 90 |
|  | 75% cumulative particle diameter (nm) | 211 | 111 | 128 | 54 | 104 | 199 | 198 | 129 | 91 | 173 | 79 | 150 | 133 |
|  | Dynamic surface tension (mN/m) | 44.6 | 42.6 | 43.5 | 40.5 | 40.0 | 45.1 | 40.2 | 43.4 | 39.7 | 43.2 | 41.6 | 42.8 | 41.3 |

[1]Product of Air Products and Chemicals, Inc.
[2]Product of BYK Japan KK

TABLE 2

|  |  | Example 1 | | | | | Example 2 | | | | |
|---|---|---|---|---|---|---|---|---|---|---|---|
|  |  |  |  | CPS | | |  |  | CPS | | |
|  |  | Ink | APS | 25% | 75% | DST | Ink | APS | 25% | 75% | DST |
| Order of landing | 1 | Y1 | 87 | 67 | 104 | 40.0 | Bk2 | 94 | 72 | 111 | 42.6 |
|  | 2 | Bk1 | 178 | 138 | 211 | 44.6 | Y2 | 168 | 132 | 199 | 45.1 |
| Bleeding evaluation | 1 × 2[*1] | A | | | | | A | | | | |

|  |  | Example 3 | | | | | Example 4 | | | | |
|---|---|---|---|---|---|---|---|---|---|---|---|
|  |  |  |  | CPS | | |  |  | CPS | | |
|  |  | Ink | APS | 25% | 75% | DST | Ink | APS | 25% | 75% | DST |
| Order of landing | 1 | Bk3 | 107 | 82 | 128 | 43.5 | Y1 | 87 | 67 | 104 | 40.0 |
|  | 2 | Y3 | 164 | 129 | 198 | 40.2 | Bk3 | 107 | 82 | 128 | 43.5 |
| Bleeding evaluation | 1 × 2[*1] | B | | | | | B | | | | |

APS: Average particle diameter (nm)
CPS: Cumulative particle diameter (nm)
DST: Dynamic surface tension (mN/m)
[*1]Evaluation results of bleeding between portion recorded with firstly landed ink and portion recorded with secondly landed ink

TABLE 3

|  |  | Example 5 | | | | | Example 6 | | | | | Example 7 | | | | |
|---|---|---|---|---|---|---|---|---|---|---|---|---|---|---|---|---|
|  |  |  |  | CPS | | |  |  | CPS | | |  |  | CPS | | |
|  |  | Ink | APS | 25% | 75% | DST | Ink | APS | 25% | 75% | DST | Ink | APS | 25% | 75% | DST |
| Order of landing | 1 | Bk4 | 46 | 36 | 54 | 40.5 | Bk4 | 46 | 36 | 54 | 40.5 | Y1 | 87 | 67 | 104 | 40.0 |
|  | 2 | C1 | 70 | 56 | 79 | 41.6 | M2 | 77 | 58 | 91 | 39.7 | C3 | 113 | 90 | 133 | 41.3 |
|  | 3 | M1 | 109 | 82 | 129 | 43.4 | C2 | 125 | 94 | 150 | 42.8 | M3 | 147 | 115 | 173 | 43.2 |
|  | 4 | Y2 | 168 | 132 | 199 | 45.1 | Y2 | 168 | 132 | 199 | 45.1 | Bk1 | 178 | 138 | 211 | 44.6 |
| Bleeding evaluation | 1 × 2*[1] | | A | | | | | B | | | | | B | | | |
|  | 2 × 3*[2] | | A | | | | | A | | | | | B | | | |
|  | 3 × 4*[3] | | A | | | | | B | | | | | B | | | |

APS: Average particle diameter (nm)
CPS: Cumulative particle diameter (nm)
DST: Dynamic surface tension (mN/m)
*[1]Evaluation results of bleeding between portion recorded with firstly landed ink and portion recorded with secondly landed ink
*[2]Evaluation results of bleeding between portion recorded with secondly landed ink and portion recorded with thirdly landed ink
*[3]Evaluation results of bleeding between portion recorded with thirdly landed ink and portion recorded with fourthly landed ink

TABLE 4

|  |  | Comparative Example 1 | | | | | Comparative Example 2 | | | | |
|---|---|---|---|---|---|---|---|---|---|---|---|
|  |  |  |  | CPS | | |  |  | CPS | | |
|  |  | Ink | APS | 25% | 75% | DST | Ink | APS | 25% | 75% | DST |
| Order of landing | 1 | Y3 | 164 | 129 | 198 | 40.2 | Bk1 | 178 | 138 | 211 | 44.6 |
|  | 2 | Bk3 | 107 | 82 | 128 | 43.5 | Y2 | 168 | 132 | 199 | 45.1 |
|  | 3 | — | — | — | — | — | — | — | — | — | — |
|  | 4 | — | — | — | — | — | — | — | — | — | — |
| Bleeding evaluation | 1 × 2*[1] | | C | | | | | C | | | |
|  | 2 × 3*[2] | | — | | | | | — | | | |
|  | 3 × 4*[3] | | — | | | | | — | | | |

|  |  | Comparative Example 3 | | | | | Comparative Example 4 | | | | |
|---|---|---|---|---|---|---|---|---|---|---|---|
|  |  |  |  | CPS | | |  |  | CPS | | |
|  |  | Ink | APS | 25% | 75% | DST | Ink | APS | 25% | 75% | DST |
| Order of landing | 1 | Bk2 | 94 | 72 | 111 | 42.6 | Y3 | 164 | 129 | 198 | 40.2 |
|  | 2 | Y1 | 87 | 67 | 104 | 40.0 | C3 | 113 | 90 | 133 | 41.3 |
|  | 3 | — | — | — | — | — | M1 | 109 | 82 | 129 | 43.4 |
|  | 4 | — | — | — | — | — | Bk2 | 94 | 72 | 111 | 42.6 |
| Bleeding evaluation | 1 × 2*[1] | | D | | | | | C | | | |
|  | 2 × 3*[2] | | — | | | | | C | | | |
|  | 3 × 4*[3] | | — | | | | | D | | | |

APS: Average particle diameter (nm)
CPS: Cumulative particle diameter (nm)
DST: Dynamic surface tension (mN/m)
*[1]Evaluation results of bleeding between portion recorded with firstly landed ink and portion recorded with secondly landed ink
*[2]Evaluation results of bleeding between portion recorded with secondly landed ink and portion recorded with thirdly landed ink
*[3]Evaluation results of bleeding between portion recorded with thirdly landed ink and portion recorded with fourthly landed ink In a two color-ink set of Example 1 composed of a black ink and a yellow ink, the average particle diameter of the pigment contained in the precedently landed yellow ink was sufficiently smaller than that of the pigment contained in the subsequently landed black ink. Furthermore, the 75% cumulative particle diameter of the pigment contained in the yellow ink was less than the 25% cumulative particle diameter of the pigment contained in the black ink. In addition, the dynamic surface tension of the yellow ink was less than that of the black ink. Therefore, bleeding was significantly suppressed.

In a two color-ink set of Example 2 composed of a black ink and a yellow ink, the order of landing in Example 1 was reversed, i.e., the black ink was landed prior to the landing of the yellow ink. The average particle diameter of the pigment contained in the black ink was sufficiently smaller than that of the pigment contained in the yellow ink. Furthermore, the 75% cumulative particle diameter of the pigment contained in the black ink was less than the 25% cumulative particle diameter of the pigment contained in the yellow ink. In addition, the dynamic surface tension of the black ink was less than that of the yellow ink. Therefore, bleeding was significantly suppressed.

In a two color-ink set of Example 3 composed of a black ink and a yellow ink, the average particle diameter of the pigment contained in the precedently landed black ink was sufficiently smaller than that of the pigment contained in the subsequently landed yellow ink. Furthermore, the 75% cumulative particle diameter of the pigment contained in the black ink was less than the 25% cumulative particle diameter of the pigment contained in the yellow ink. However, the dynamic surface tension of the black ink was greater than the degree of suppression of bleeding of the yellow ink. Therefore, the degree of suppression of bleeding was slightly less than the degree of suppression of bleeding in the ink set of each of Examples 1 and 2. However, the obtained effect of suppressing bleeding was practically acceptable.

In a two color-ink set of Example 4 composed of a black ink and a yellow ink, the average particle diameter of the pigment contained in the precedently landed yellow ink was smaller than that of the pigment contained in the subsequently landed black ink. In addition, the dynamic surface tension of the yellow ink was less than that of the black ink. However, the 75% cumulative particle diameter of the pigment contained in the precedently landed yellow ink was greater than the 25% cumulative particle diameter of the pigment contained in the subsequently landed black ink. Therefore, the degree of suppression of bleeding was slightly less than the degree of suppression of bleeding in the ink set of each of Examples 1 and 2. However, the obtained effect of suppressing bleeding was practically acceptable.

In a four color-ink set of Example 5, the inks were landed in the following order: a black ink, a cyan ink, a magenta ink and a yellow ink. In this case, the average particle diameter of the pigment contained in each precedently landed ink was sufficiently smaller than that of the pigment contained in each subsequently landed ink. Furthermore, the 75% cumulative particle diameter of the pigment contained in each precedently landed ink was smaller than the 25% cumulative particle diameter of the pigment contained in each subsequently landed ink. In addition, the dynamic surface tension of each precedently landed ink was less than that of each subsequently landed ink. Therefore, bleeding between all the ink recorded portions was significantly suppressed.

In a four color-ink set of Example 6, the inks were landed in the following order: a black ink, a magenta ink, a cyan ink and a yellow ink. In this case, the average particle diameter of the pigment contained in each precedently landed ink was sufficiently smaller than that of the pigment contained in each subsequently landed ink. However, the dynamic surface tension of the black ink was greater than that of the magenta ink. In addition, the 75% cumulative particle diameter of the pigment contained in the cyan ink was greater than the 25% cumulative particle diameter of the pigment contained in the yellow ink. Therefore, the degree of suppressing bleeding between a portion recorded with the black ink and a portion recorded with the magenta ink and between a portion recorded with the cyan ink and a portion recorded with the yellow ink was slightly low. However, the obtained effect of suppressing bleeding was practically acceptable.

In a four color-ink set of Example 7, the inks were landed in the following order: a yellow ink, a cyan ink, a magenta ink and a black ink. In this case, the average particle diameter of the pigment contained in each precedently landed ink was sufficiently smaller than that of the pigment contained in each subsequently landed ink. In addition, the dynamic surface tension of each precedently landed ink was less than that of each subsequently landed ink. However, the 75% cumulative particle diameter of the pigment contained in the yellow ink was greater than the 25% cumulative particle diameter of the pigment contained in the cyan ink, the 75% cumulative particle diameter of the pigment contained in the cyan ink was greater than the 25% cumulative particle diameter of the pigment contained in the magenta ink, and the 75% cumulative particle diameter of the pigment contained in the magenta ink was greater than the 25% cumulative particle diameter of the pigment contained in the black ink. Therefore, the degree of suppressing bleeding between a portion recorded with the yellow ink and a portion recorded with the cyan ink, between a portion recorded with the cyan ink and a portion recorded with the magenta ink and between a portion recorded with the magenta ink and a portion recorded with the black ink was slightly low. However, the obtained effect of suppressing bleeding was practically acceptable.

In a two color-ink set of Comparative Example 1 composed of a black ink and a yellow ink, the dynamic surface tension of the precedently landed yellow ink was less than that of the subsequently landed black ink. However, the average particle diameter of the pigment contained in the yellow ink was greater than that of the pigment contained in the black ink. Therefore, bleeding was not suppressed.

In a two color-ink set of Comparative Example 2 composed of a black ink and a yellow ink, the order of landing in Comparative Example 1 was reversed, i.e., the black ink was landed prior to the landing of the yellow ink. Although the dynamic surface tension of the precedently landed black ink was less than that of the yellow ink, the average particle diameter of the pigment contained in the black ink was greater than that of the pigment contained in the yellow ink. Therefore, bleeding was not suppressed.

In a two color-ink set of Comparative Example 3 composed of a black ink and a yellow ink, the dynamic surface tension of the precedently landed black ink was greater than that of the subsequently landed yellow ink, and the average particle diameter of the pigment contained in the black ink was greater than that of the pigment contained in the yellow ink. Therefore, bleeding was apparently not suppressed, and the ink set was not suitable for practical use.

In a four color-ink set of Comparative Example 4, the inks were landed in the following order: a yellow ink, a cyan ink, a magenta ink and a black ink. In this case, the average particle diameter of the pigment contained in each precedently landed ink was greater than that of the pigment contained in each subsequently landed ink. In addition to this, the dynamic surface tension of the magenta ink was greater than that of the black ink. Therefore, bleeding was apparently not suppressed between a portion recorded with the black ink and a portion recorded with the magenta ink. In addition, bleeding was not suppressed between a portion recorded with the yellow ink and a portion recorded with the cyan ink and between a portion recorded with the cyan ink and a portion recorded with the magenta ink.

What is claimed is:

1. An ink-jet recording method in which a plurality of pigment inks constituting an ink set for ink-jet recording are ejected from an ink-jet head onto a recording medium in order to form an ink-jet recording image on the recording medium, the ink-jet recording method comprising:

preparing an ink-jet for ink jet recording comprising a plurality of pigment inks, wherein at least two pigment inks in the ink set are different in average particle diameter to each other;

landing a first pigment ink in the ink set on the recording medium; and subsequently landing a second pigment ink in the ink set on the recording medium, an average particle diameter of the pigment comprised in the second pigment ink is equal to or larger than an average particle diameter of the pigment comprised in the first pigment ink, and a dynamic surface tension of the first pigment ink is equal to or less than a dynamic surface tension of the second pigment ink, and wherein these relationships between the first pigment ink and the second pigment ink on an average particle diameter of a pigment and on a dynamic surface tension of a pigment ink are satisfied for all of the pigment inks.

2. The ink-jet recording method according to claim 1, wherein a 75% cumulative particle diameter of the pigment comprised in the first pigment ink is less than a 25% cumulative particle diameter of the pigment comprised in the second pigment ink.

3. The ink-jet recording method according to claim 1, wherein the ink set comprises a black ink and a yellow ink.

4. The ink-jet recording method according to claim 1, wherein the ink set comprises a black ink, a yellow ink, a magenta ink and a cyan ink.

5. An ink jet recording apparatus according to claim 1, wherein the dynamic surface tension is a dynamic surface tension at a lifetime of 100 ms.

6. An ink-jet recording apparatus, comprising:
- an ink set for ink-jet recording including a plurality of pigment inks each including a pigment, wherein at least two pigment inks are different in average particle diameter of the pigment contained therein to each other;
- an ink-jet head for ejecting the pigment inks constituting the ink set onto the recording medium; and
- an image forming device for forming an ink-jet recording image on the recording medium by landing pigment inks in the ink set on the recording medium; wherein
- an average particle diameter of the pigment contained in a pigment ink that precedently lands on a recording medium is equal to or less than an average particle diameter of the pigment contained in a pigment ink that subsequently lands on the recording medium, and a dynamic surface tension of the pigment ink that precedently lands on the recoding medium is equal to or less than a dynamic surface tension of the second pigment ink that subsequently lands on the recording medium, and
- wherein these relationships between the precedently landing pigment ink and the subsequently landing pigment ink on an average particle diameter of a pigment and on a dynamic surface tension of a pigment ink are satisfied for all of the pigment inks.

7. An ink jet recording apparatus according to claim 6, wherein a 75% cumulative particle diameter of the pigment contained in the pigment ink that precedently lands on the recording medium is less than a 25% cumulative particle diameter of the pigment contained in the pigment ink that subsequently lands on the recording medium.

8. An ink-jet recording apparatus according to claim 6, wherein the plurality of pigment inks comprise a black ink and a yellow ink.

9. An ink jet recording apparatus according to claim 6, wherein the plurality of pigment inks comprise a black ink, a yellow ink, a magenta ink and a cyan ink.

10. An ink jet recording apparatus according to claim 6, wherein the dynamic surface tension is a dynamic surface tension at a lifetime of 100 ms.

* * * * *